US009534901B2

(12) United States Patent
Aas et al.

(10) Patent No.: US 9,534,901 B2
(45) Date of Patent: Jan. 3, 2017

(54) ACCESS ROUTE OPTIMIZATION FOR HARVESTABLE RESOURCES

(71) Applicant: International Business Machines Corporation, Armonk, NY (US)

(72) Inventors: Cecilia J. Aas, Cambridge (GB); Raymond S. Glover, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 14/567,644

(22) Filed: Dec. 11, 2014

(65) Prior Publication Data

US 2016/0169686 A1 Jun. 16, 2016

(51) Int. Cl.

*A01B 69/04* (2006.01)
*G01C 21/20* (2006.01)
*G06Q 10/06* (2012.01)
*G06Q 50/02* (2012.01)
*G01C 21/34* (2006.01)

(52) U.S. Cl.

CPC ............... *G01C 21/20* (2013.01); *G01C 21/34* (2013.01); *G06Q 10/06313* (2013.01); *G06Q 50/02* (2013.01)

(58) Field of Classification Search

USPC .......................................................... 701/408
See application file for complete search history.

(56) References Cited

U.S. PATENT DOCUMENTS 6,934,615 B2 * 8/2005 Flann .................. A01B 69/008 172/2
9,217,649 B1 * 12/2015 Dror ..................... G01C 21/00
2006/0265342 A1 * 11/2006 Froyland ................ G06Q 99/00 705/500

FOREIGN PATENT DOCUMENTS

CN 102524016 A 7/2012
CN 102812843 A 12/2012
JP 2012127160 A 7/2012

OTHER PUBLICATIONS

U.S. Appl. No. 14/853,218, Entitled "Access Route Optimization for Harvestable Resources", filed Sep. 14, 2015.
Appendix P "List of IBM Patents or Patent Applications Treated as Related", Filed on Sep. 14, 2015, pp. 2.
Brinker, et al., "Forest Roads and Construction of Associated Water Diversion Devices", ACES Publications ANR-916, New Mar. 1995, Printed Oct. 1, 2014, <http:www.aces.edu/pubs/docs/A/ANR-0916/>.
Epstein, et al., "A Combinatorial Heuristic Approach for Solving Real-Size Machinery Location and Road Design Problems in Forestry Planning", Operations Research, Published Online, Dec. 1, 2006, Printed Oct. 1, 2014, <http://pubsonline.informs.org/doi/abs/10.1287/opre.1060.0331>.

(Continued)

*Primary Examiner* — Adam Tissot
(74) *Attorney, Agent, or Firm* — Isaac J. Gooshaw

(57) ABSTRACT

Methods and apparatuses for generating a route plan for accessing harvestable resources is provided. A processor receives a node layout for a location with harvestable resources, wherein the location includes at least two parcels. A processor determines a first route network for the location at a first time step. A processor determines a second route network for the location at a second time step. A processor generates a first route plan is based, at least in part, on the first route network and the second route network.

9 Claims, 4 Drawing Sheets

(56) References Cited

OTHER PUBLICATIONS

Gumus, et al., “Functional forest road network planning by consideration of environmental impact assessment for wood harvesting”, Environ Monit Assess, Jul. 2008, Epub Sep. 15, 2007, Printed Oct. 1, 2014, <http://www.ncbi.nlm.nih.gov/pubmed/17874200>.
Hayati, et al.; “Qualitative evaluation and optimization of forest road network to minimize total costs and environmental impacts”, iForest, Journal of Biogeosciences and Forestry, Published by SISEF, vol. 5, Jun. 2012, Copyright 2012, Printed Oct. 1, 2014, <http://www.sisef.it/iforest/ontents/?id=ifor0610-009>.
Safiah, et al., “Optimization of the Route of the Forest Logging Road”, 2010 International Conference on Chemistry and Chemical Engineering (ICCCE 2010).
Stuckelberger, Jurg Andreas, A Weighted-Graph Optimization Approach for Automatic Location of Forest Road Networks, Copyright 2008.
“Minimum Cost Flow Problem”, Printed Oct. 1, 2014, <http://lemon.cs.elte.hu/pub/doc/latest/a00005.html>.
“CostScaling< GR, V, C, TR > Class Template Reference”, Printed Oct. 1, 2014, <http://lemon.cs.elte.hu/pub/doc/latest/a00102.html>.

* cited by examiner

ACCESS ROUTE OPTIMIZATION FOR HARVESTABLE RESOURCES

BACKGROUND OF THE INVENTION

The present invention relates generally to the field of access route layouts, and more particularly to optimizing access route layouts for harvesting resources.

Harvesting is the collection of a resource, once the resource has matured or has become harvestable. Crops and trees are planted and, once they have matured or reached a certain age, collected. Fish are introduced to a body of water and, once they reach a certain population, captured. For larger operations, different portions of land or water, or parcels, are used to offset the different grow cycles and/or different times to reach maturity of the resource. Routes to access the various parcels are designed to have a minimal impact on the resources while allowing for collection of the resources.

SUMMARY

According to one embodiment of the present disclosure, a method for generating a route plan for accessing harvestable resources is provided. The method includes receiving a node layout for a location with harvestable resources, wherein the location includes at least two parcels. The method includes determine a first route network for the location at a first time step. The method includes determining a second route network for the location at a second time step. The method includes generating a first route plan is based, at least in part, on the first route network and the second route network.

According to another embodiment of the present disclosure, a computer program product for generating a route plan for accessing harvestable resources is provided. The computer program product comprises a computer readable storage medium and program instructions stored on the computer readable storage medium. The program instructions include program instructions to receive a node layout for a location with harvestable resources, wherein the location includes at least two parcels. The program instructions include program instructions to determine a first route network for the location at a first time step. The program instructions include program instructions to determine a second route network for the location at a second time step. The program instructions include program instructions to generate a first route plan is based, at least in part, on the first route network and the second route network.

According to another embodiment of the present disclosure, a computer system for generating a route plan for accessing harvestable resources is provided. The computer system includes one or more computer processors, one or more computer readable storage media, and program instructions stored on the computer readable storage media for execution by at least one of the one or more processors. The program instructions include program instructions to receive a node layout for a location with harvestable resources, wherein the location includes at least two parcels. The program instructions include program instructions to determine a first route network for the location at a first time step. The program instructions include program instructions to determine a second route network for the location at a second time step. The program instructions include program instructions to generate a first route plan is based, at least in part, on the first route network and the second route network.

DETAILED DESCRIPTION

Figure 1:
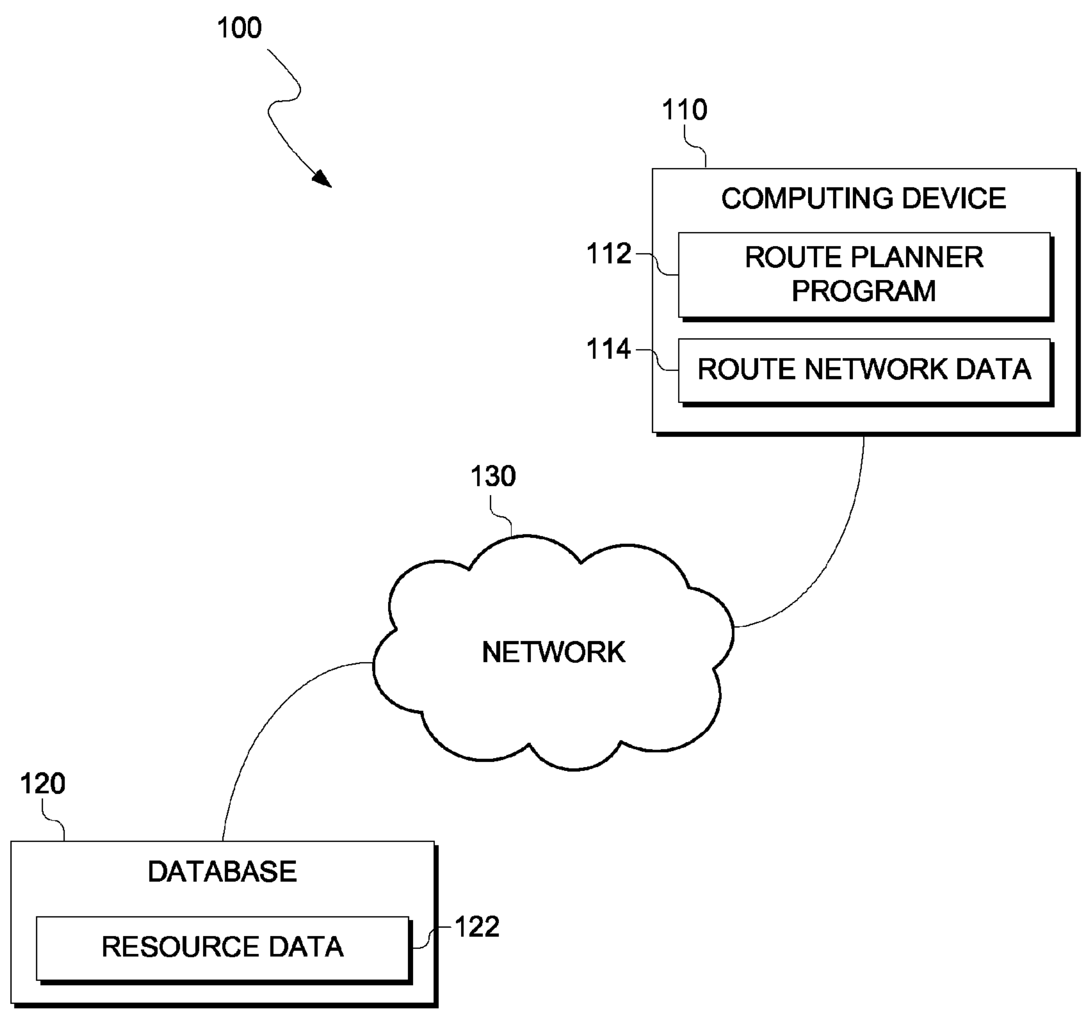
FIG. 1 is a functional block diagram illustrating a route planning environment, in accordance with an exemplary embodiment of the present invention.

While solutions to planning access routes for collection of resources are known, they do not take into consideration changing conditions over time. Specifically, in some situations, different portions of land (e.g., parcels) are in condition for harvest while other parcels are not. Furthermore, during the time required for a resource to reach maturity (for example, to become harvestable) the costs to harvest that resource may change. For example, equipment used for harvesting may become cheaper at a later date when a parcel of resources is harvestable. Embodiments of the present invention recognize that route planning that takes into account changing or varying conditions (such as the amount of resources collected at a given time) and the cost expected to collect those resources at a given time, provides lower costs of the lifetime of the entire route network. Previous solutions plan routes for a single point in time under a single set of conditions. Embodiments of the present invention provide route planning that consider conditions for multiple points in time when determining potential routes to access resources. Embodiments of the present invention provide a route network for multiple points in time that, over the life of the route network, results in a more cost efficient implementation of the route network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating a route planning environment, generally designated 100, in accordance with one embodiment of the present invention. Route planning environment 100 includes computing device 110 and database 120 connected over network 130. Computing device 110 includes route planner program 112 and route network data 114. Database 120 includes resource data 122.

In various embodiments of the present invention, computing device 110 and database 120 are each a computing device that can be a standalone device, a server, a laptop computer, a tablet computer, a netbook computer, a personal computer (PC), or a desktop computer. In another embodiment, computing device 110 and database 120 each represent a computing system utilizing clustered computers and components to act as a single pool of seamless resources. In general, computing device 110 and database 120 can each be any computing device or a combination of devices with access to route network data 114 and resource data 122 and is capable of executing route planner program 112. Computing device 110 and database 120 may each include internal and external hardware components, as depicted and described in further detail with respect to FIG. 4.

In this exemplary embodiment, route planner program 112 and route network data 114 are stored on computing device 110. In the exemplary embodiment, resource data 122 is stored on database 120. However, in other embodiments, route planner program 112, route network data 114 and resource data 122 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110 and database 120, in accordance with a desired embodiment of the present invention.

In exemplary embodiments, route planner program 112 designs a network of access routes for one or more locations containing harvestable resources. In one embodiment, harvestable resources include resources such as lumber, crops, livestock or minerals. Resource data 122 stores information regarding a location and the resources of the location. Resource data 122 stores information the regarding the contours of location (for example, elevation and gradients of parts of the location), landmarks and/or terrain of the location (for example, natural obstacles such as cliffs, rivers or other impassable terrain), and the current state of access routes present at the location (e.g., the location and age of current access routes of the location). Resource data 122 also stores various types of information including, for example, one or more of: the types of resources of the location, the ages of the resources, a period of time that each type of resource takes to become harvestable, a date at which the resource is scheduled to be harvested, a date at which the resource is expected to be harvestable, a density of the resource, and/or an amount of harvestable resources of the location. Resource data 122 is segmented subsections of the location such as plots, areas or sections (referred to hereinafter as parcels) containing the harvestable resources. In one embodiment, each parcel has an associated time and/or date when the resources of the parcel are harvestable or to be harvested. For example, a parcel is harvestable when the resources of the parcel have matured. As another example, the parcel has a predetermined time and/or date when the resources of the parcel are to be harvested. In some embodiments, a parcel has a directionality associated with the resources. For example, a resource, such as lumber or crops, may have been planted in rows running parallel with one another. In such embodiments, resource data 122 includes a directionality vector indicating a preferred direction when accessing resources of a parcel (e.g., accessing the rows in a perpendicular direction cause less damage to the remaining resources).

In some embodiments, route planner program 112 determines a node layout for a location based on resource data 122. The nodes of the node layout are possible points in a network of access routes that the access routes may potentially pass through. Note that, in one embodiment, a larger number of nodes in the node layout provide a more flexible solution for the access routes. However, in some embodiments, an increase in the number of nodes also increases the complexity and computation resources required to optimize the network of access routes. The determination, by route planner program 112, of an amount of nodes and the locations of those nodes for a given location of harvestable resources yields an initial network model. Route planner program 112 uses this initial network model to determine an optimal access route layout.

Figure 2:
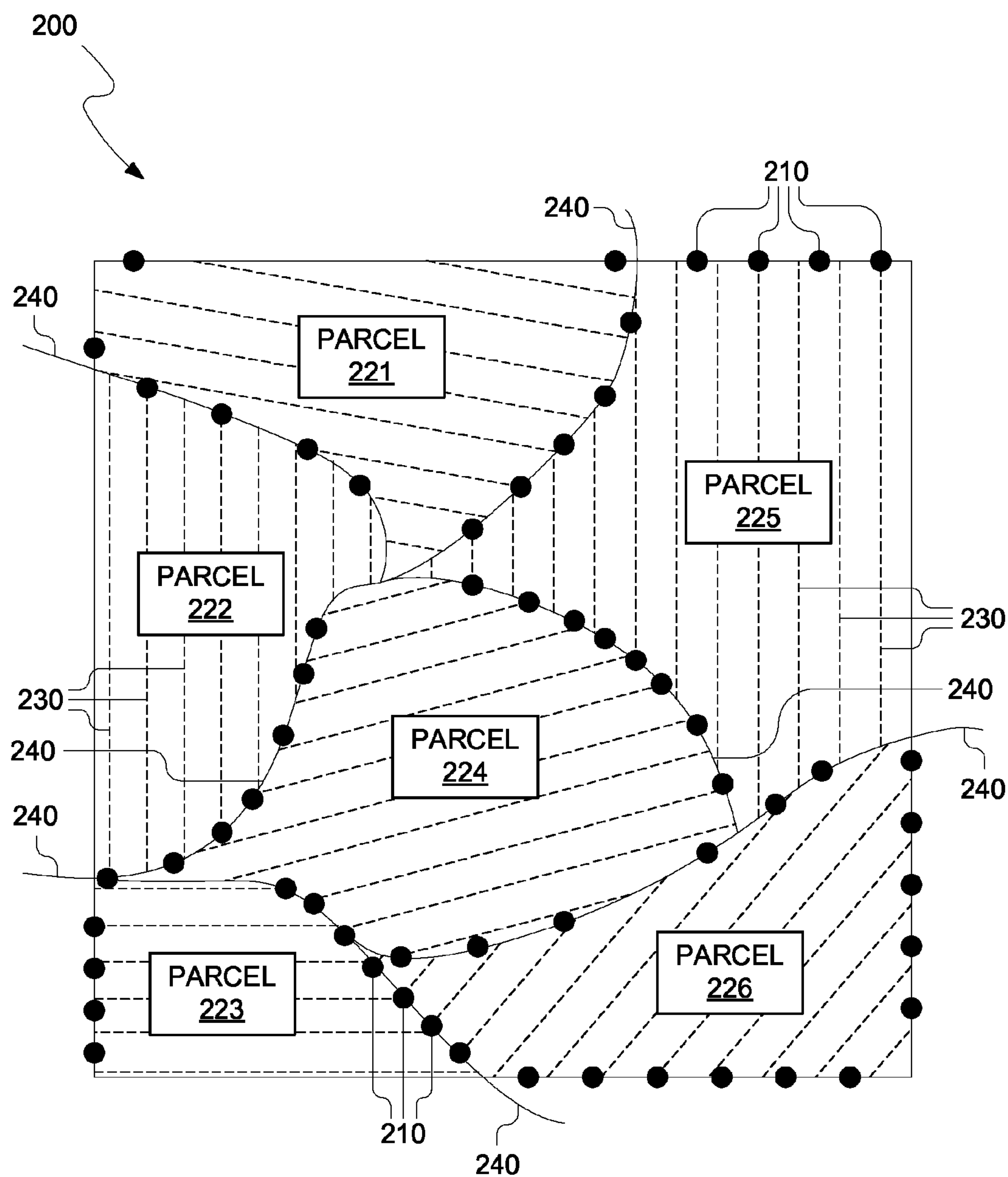
FIG. 2 illustrates a visualization of an example node layout, in accordance with an exemplary embodiment of the present invention.

In one embodiment, to determine the optimal access route layout, route planner program 112 creates a distribution of nodes along the boundaries of each parcel. If a location does not have parcels in resource data 122, then route planner program 112 creates parcels based on contiguous areas with resources of the similar age or maturity. In some scenarios and embodiments, route planner program 112 also determines the distribution or density of nodes along a boundary of a parcel based on a directionality of the resources in the parcel and any adjoining parcels. In general, the more perpendicular a directionality is to a particular boundary, the larger the distribution of nodes is along that boundary. Likewise, the more parallel a directionality is in relation to a particular boundary, the smaller the distribution of nodes is along that boundary. In other words, route planner program 112 adds more nodes along boundaries that are more perpendicular to a directionality when compared to boundaries that are more parallel to that directionality. For boundaries with multiple parcels, route planner program 112 aggregates the node distribution determined from the surrounding parcels. FIG. 2 includes a more detailed discussion of determining a node layout. Route planner program 112 stores the determined node layout in route network data 114.

In some embodiments, route planner program 112 receives input, from a user, to upload a node layout to route network data 114. In some embodiments, route planner program receives edits, from a user, that indicate changes to the determined node layout. For example, a user includes additional nodes or removes nodes from the determined node layout. In some embodiments, route planner program 112 receives input, from a user, regarding access routes currently present at a location. For example, route planner program 112 receives data, from the user, that specifies nodes and connections between the nodes, which represent one or more access routes. In some embodiments, route planner program 112 receives, from the user, ages of the currently implemented access routes.

In various embodiments, route planner program 112 receives input, from a user, regarding at least one collection node or drop-off nodes. A collection node or drop-off node, as used herein, is a node in the node layout that resources are delivered to after those resources are harvested. As discussed later herein, route planner program 112 creates a route network connected to at least one drop-off node such that harvested resources can be collected. In some embodiments, route planner program 112 receives a selection, from a user, of a node included in a node layout (which is stored in route network data 114) that indicates that the selected node is to be a drop-off node. In some embodiments, route planner program 112 receives a command from a user to create a drop-off node in the node layout. In some embodiments, drop-off nodes have a zero or nominal (e.g., a small amount) amount of cost associated with creation of those drop-off nodes.

In some embodiments, route planner program 112 receives a time frame from a user regarding a range of dates and/or times for which the route network is to be determined. In some scenarios and embodiments, route planner program 112 receives further input from a user regarding times steps. As used herein, time steps are periods of time that divide the time frame into subdivisions. Each time step corresponds to a period in time within the time frame. Each time step is used to indicate the state of the network of access routes during that period. For example, a period of eighty years (eighty-year span) and a time step of five years (i.e., five-year intervals) are received. Route planner program 112 determines a route network that accounts for the eighty-year span with plans for one or more route networks that are generated at five-year intervals over the eighty-year span. In some embodiments, route planner program 112 automatically determines both the period and time step based on resource data 122 and route network data 114. For example, route planner program 112 determines the time frame based on the time a resource takes to mature and become harvestable. As another example, route planner program 112 determines the time steps based on the average lifetime of a path in the route network.

In various embodiments, route planner program 112 determines adjacent nodes of the node layout stored in route network data 114. In one embodiment, route planner program 112 determines nodes within a certain distance are adjacent to one another. For example, nodes within a predetermined radial distance from one another are considered adjacent. In another example, route planner program 112 considers nodes with a distance traveled by a potential route between nodes to be adjacent if that distance is below a predetermined threshold. In one embodiment, route planner program 112 stores data indicating adjacent nodes as part of route network data 114. In one embodiment, route planner program 112 considers a route between two adjacent nodes to be a potential candidate for a portion of an access route (to be included as part of route network data 114). Such potential candidates for portions of an access route are referred to hereinafter as a path. In one embodiment, route planner program 112 represents such paths as edges in a network model (included as part of route network data 114), with the nodes of the node layout representing vertices of the network model. In some embodiments, route network data 114 includes cost and maintenance information for paths between such nodes. For example, route planner program 112 determines a cost of a path between two nodes of the node layout. A cost of a path is proportional to one or more of the following: (i) the angle of the path to the directionality of a parcel (e.g., how perpendicular a directionality is to a path); (ii) the length of the path; (iii) the cost of preparing the area covered by the path for construction or implementation of the path; (iv) the cost of building the path (e.g., materials and labor); and (v) the age or maturity of a resource in parcels next to the nodes. Route planner program 112 receives input from a user regarding a maintenance cost of the path or the type of path to be used in the access route. For example, a path has a fixed or variable cost over a lifetime of the path in addition to an expected lifespan of the path.

In some embodiments, route planner program 112 determines a cost associated with each path between adjacent nodes. In some embodiments and scenarios, route planner program 112 determines both a time invariant cost and a time variant cost for a given path. As used herein, a time invariant cost is a cost that does not change over the time. For example, an invariant cost includes the cost to create a route between two nodes that do not change from one time step to the next (e.g., the materials and labor to create the route do not change over time). As another example, an invariant cost can be set to infinity or a large amount to prevent route planner program 112 from creating a route through a certain location. For example, an invariant cost is set to infinity to prevent route planner program 112 from creating as a route that passes through a natural obstacle, such as a cliff. In contrast, as used herein, time variant costs are costs that vary over time for a given path. For example, the maintenance cost for a path is less for a newer path when compared to the maintenance cost for an older path. In some embodiments, route planner program 112 determines the time variant costs for a path in a route based, at least in part, on the age of the path (e.g., starting from when the path is created) for a series of time steps during which the path is statistically likely to be in use. In some embodiments and scenarios, for a given time step, route planner program 112 determines the total cost, which includes both time invariant costs and time variant costs, for a potential path that could be created between two adjacent nodes.

In various embodiments, route planner program 112 determines which parcels are harvestable for all time steps. In some embodiments and scenarios, based on the age or maturity of resources in a parcel, route planner program 112 determines whether a parcel is harvestable at one or more time steps. In one embodiment, when a parcel is determined to be harvestable for a given time step, route planner program 112 sets a flow indicator to "one" for all nodes on the boundaries of the harvestable parcel for one or more time steps in which the parcel is determined to be harvestable. For any node that is not on a boundary of a harvestable parcel at a given time step, the flow indicator is set to zero for that node and time step. In some embodiments and scenarios, route planner program 112 sets a flow indicator for a node when the resources of a parcel are harvestable. In some embodiments, route planner program 112 determines an amount of a given resource that is harvestable at the location of the node for a given time step. In some embodiments and scenarios, route planner program 112 determines a value of the amount of harvestable resource and uses a value cost-benefit analysis to determine whether it is cost effective to harvest that resource (as discussed in further detail herein).

In various embodiments, route planner program 112 determines a route network for each time step. Route planner program 112 determines a required set of paths for each time step. For example, route planner program 112 selects one or more paths such that all nodes on a boundary for a parcel that is harvestable (for a given set of time steps) are part of the route network. In some embodiments, route planner program 112 receives input from a user regarding paths and/or nodes that are to be included in the network for certain time steps. For example, a drop-off node is selected for each time step. In some embodiments and scenarios, route planner program 112 determines cost associated with each possible path for the route network of each time step. In some embodiments and scenarios, for each time step, route planner program 112 determines a route network based on a minimum cost flow algorithm using the node layouts for each time step and cost information associated with each potential path. In some embodiments and scenarios, route planner program 112 determines harvestable parcels for each time step and assigns a flow indicator to any adjacent nodes to the harvestable parcels. In some embodiments and scenarios, route planner program 112 determines an associated cost for each path of the route network. In some embodiments and scenarios, route planner program 112 determines a route network that connects the nodes, based, at least in part, on flow indicators, and any required nodes such as drop off nodes. In some embodiments and scenarios, route planner program 112 determines such a route network while minimizing the total cost of all paths.

In some embodiments and scenarios, route planner program 112 determines a time-weight for one or more time steps for a given path. In some embodiments and scenarios, route planner program 112 determines the amount of time between time steps and, based on the amount of time between time steps, assigns a weight to the difference. For example, a path at one time step will have a higher weight when compared to the same path with a smaller difference in time steps (e.g., one time step difference), where the same path with a larger difference in time steps has a smaller weight.

In some embodiments and scenarios, route planner program 112 scales a cost-benefit differential with the determined time-weight for a path at a first time step and the same path at a second time step. As used herein, the cost-benefit differential is a rate change in a cost-benefit ratio for a path from one time step to another. The cost-benefit ratio is the amount of resources a node will harvest at a time step divided by the costs of any connected paths from the node. In some embodiments and scenarios, route planner program 112 scales the cost-benefit differential based on the time-weight. In some embodiments and scenarios, for a given path at a given time step, route planner program 112 determines a time-weighted cost-differential is determined for the path for all other time steps. In some embodiments and scenarios, route planner program 112 offsets the cost of the given path at a given time step based, at least in part, on each determined time-weighted cost-differential. In some embodiments and scenarios, route planner program 112 updates the cost of a given path based, at least in part, on an offset determined for all time steps (e.g., an average offset).

In some embodiments and scenarios, route planner program 112 iteratively performs the minimum cost flow analysis using updated costs of each path, which are offset by the time-weighted cost-benefit differentials. In some embodiments and scenarios, route planner program 112 generates a new route network based on the updated costs of each path. In some embodiments and scenarios, if the total costs of the new route network are less than the total costs of the previous route network, then route planner program 112 updates the previous route network with the new route network. In some embodiments and scenarios, route planner program 112 determines a new set of time-weighted cost-benefit differentials based on the updated route network. In some embodiments and scenarios, route planner program 112 iteratively determines new sets of time-weighted cost-benefit differentials based on updated route networks until the total costs of the new route network are greater to or equal to the previous route network. In some embodiments and scenarios, once the costs remain constant or increase beyond that of the previous route network, route planner program 112 saves the previous route network as part of route network data 114. As such, route network data 114 includes a plan that has routes to be implemented for each time step of a given time period that was analyzed by route planner program 112. In some embodiments, route network data 114 includes one or both of a total cost of the route network and a cost of the individual paths of the route network.

FIG. 2 depicts visualization, 200, of an example node layout, in accordance with an exemplary embodiment of the present invention. Visualization 200 includes nodes 210, parcels 221, 222, 223, 224, 225 and 226, directionality vectors 230 and boundaries 240. In this example, a location with harvestable resources is separated into six parcels 221, 222, 223, 224, 225 and 226. Data regarding parcels 220, directionality vectors 230 and boundaries 240 are stored as part of resources data 122. Each of the parcels 220 includes a type of resource. In some embodiments, each of the parcels 220 includes a composition or mixture of resources. For each type of resource in a parcel, the age of the resource is also stored as part of resources data 122. Resources data 122 also includes the contour and dimensions of the parcels 220. Route planner program 112 determines the cost of creating a route (e.g., grade and dimensions) based on the contours and dimensions of land within the parcels. Each of the parcels 220 has one or more directionality vectors 230 associated with the respective parcels 220. Directionality vectors 230 indicate a preferred direction to harvest a resource within a parcel of parcels 220. In visualization 200, directionality vectors are uniform in direction and density for a given parcel. In other embodiments, directionality vectors 230 vary in both direction and density for a given parcel. For example, a parcel with more resources for a given area has a higher number of directionality vectors 230 than a parcel with fewer resources for an area of the same size. In another example, a parcel has two or more resources with two separate preferred harvesting directions that correspond to at least one of those resources. As such, the directionality vectors of the parcel are oriented to match the preferred directions of the relevant portions of the parcel with the two separate preferred harvesting directions.

Boundaries 240 are the perimeters of parcels 221, 222, 223, 224, 225, and 226 and serve as potential locations for nodes 210. Note that, for ease of understanding, only some of the nodes illustrated in FIG. 2 are labeled as 210. In visualization 200, parcels 221, 222, 223, 224, 225, and 226 abut one another. In other embodiments, parcels 221, 222, 223, 224, 225, and 226 have non-harvestable area in between one another such that they are separated from each other by that non-harvestable area. In such embodiments, the inscribing portions of boundaries 240 serve as potential locations for nodes 210. In various embodiments, route planner program 112 determines a node layout based on resources data 122. For boundaries 240 of parcels 220, route planner program 112 determines a node density for segments of boundaries 240 resulting in nodes 210. Route planner program 112 determines the angle of intersection of the directionality vectors 230 for each parcel against a boundary. Note that, for ease of understanding, only some of the directionality vectors of parcels 221, 222, 223, 224, 225, and 226 illustrated in FIG. 2 are labeled as 230. For boundary segments where intersecting directionality vectors 230 are more perpendicular, route planner program 112 creates a higher number of nodes for that segment of boundaries 240. In other words, route planner creates a higher density of nodes along boundary segments where intersecting directionality vectors 230 are more perpendicular. For boundary segments where intersecting directionality vectors 230 are less perpendicular, route planner program 112 creates a fewer number of nodes for that segment of boundaries 240. Once all boundaries 240 are evaluated, route planner program 112 determines possible locations for nodes 210. As such, nodes 210 serve as potential points that routes may pass through when route planner program 112 determines an optimal route network. In some embodiments and scenarios, route planner program 112 determines the flow or collection of resources for all times for each node, as well as costs of the nodes and paths in between adjacent nodes as discussed herein.

The preceding determination of a node layout of nodes 210 provides a minimal layout from which to create a route network of the location of harvestable resources. Route planner program 112 uses such a minimal layout to determine an actual route network, i.e., the final route layout. In general, a higher density of nodes provides more possibilities for a route network at locations that yield a larger amount of resources at lower cost when compared to locations that yield a comparatively smaller amount of resources or an amount of resources at a higher cost. In other embodiments, route planner program 112 determines a node layout of nodes 210 following other methods. For example, the node layout of nodes 210 is a uniform distance between each node along boundaries 240 (e.g., place a node for every certain amount of distance traveled along a boundary). One of ordinary skill in the arts will appreciate that any method to generate a node layout of nodes 210 can be used without deviating from the spirit and scope of the invention. As such, one skilled in the Art appreciates that any density of nodes 210, and the placement of nodes 210 in a location, can be used by route planner program 112 based on a variety of selection/none placement criteria. In some embodiments, placement of nodes 210 in a given location is based, at least in part, on limitations in computational resources of computing device 110.

Figure 3:
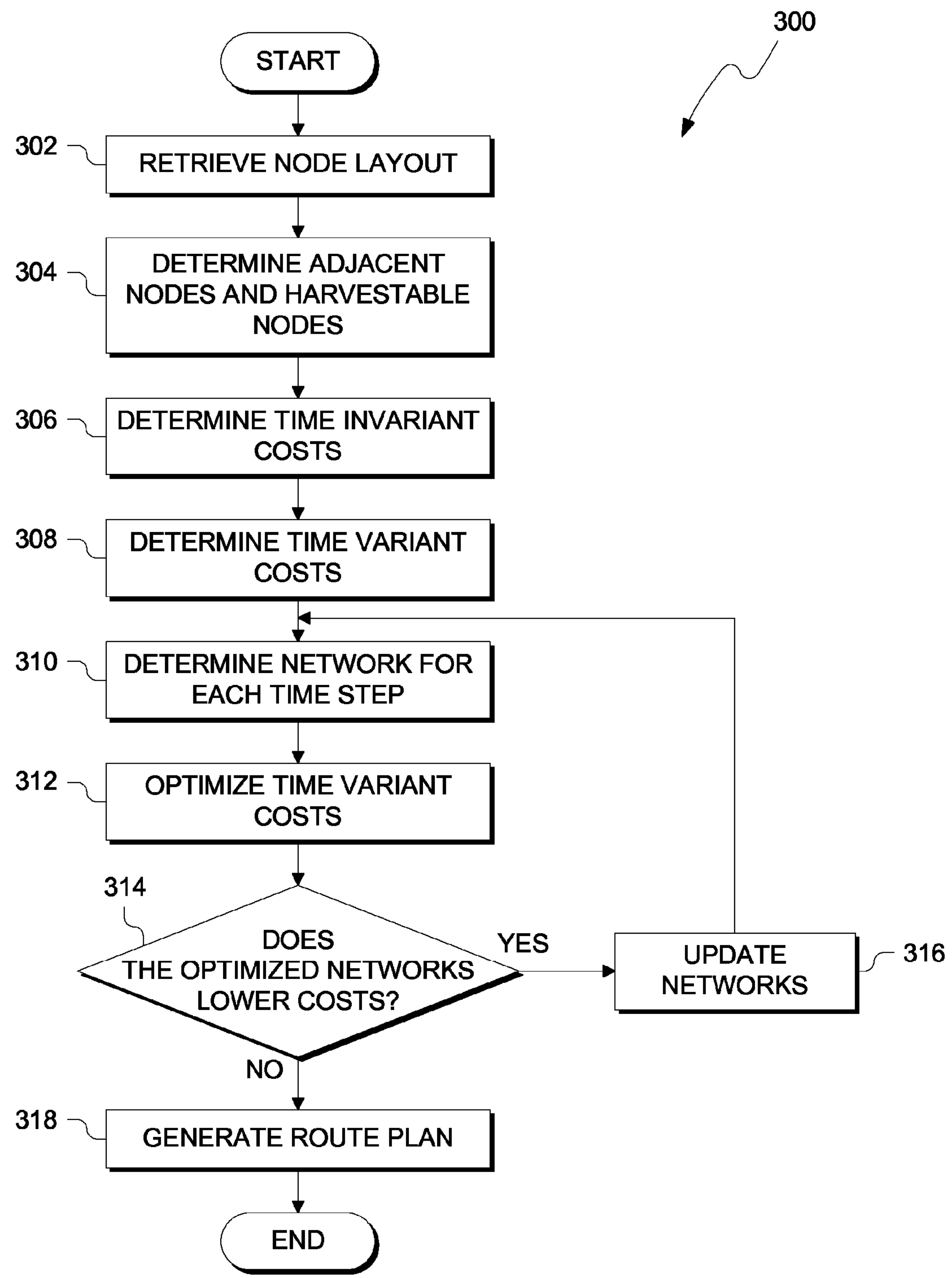
FIG. 3 illustrates operational processes of a route planner program, on a computing device within the environment of FIG. 1, in accordance with an exemplary embodiment of the present invention.

FIG. 3 illustrates operational processes 300 of route planner program 112, on computing device 110, in accordance with an exemplary embodiment of the present invention. In process 302, route planner program 112 retrieves a node layout from route network data 114. The node layout is based, at least in part, on data that was retrieved from resource data 122. The node layout includes one or more nodes in a location with harvestable resources. The location with harvestable resources is separated into parcels, each parcel with a maturity or age of resources of the parcel. Route planner program 112 places the nodes of the node layout on the boundaries of at least one parcel. Route planner program 112 determines, for each node, an amount of harvestable resources collectable at the nodes across a given time period for various time steps of the time period. In some embodiments, route planner program 112 receives, from a user, the amount of harvestable resources collectable at a node for one or more time steps.

In process 304, route planner program 112 determines adjacent nodes and harvestable nodes. Route planner program 112 determines a distance between nodes in the node layout. For a pair of nodes below a certain distance between one another, route planner program 112 determines the pair of nodes to be adjacent. The pair of nodes is considered potential candidates for a path between the nodes to generate a route network. The threshold of the distance reduces the number of adjacent nodes, thereby limiting the calculations needed to determine a route network. In some embodiments, all nodes of the node layout are considered adjacent and each pair of nodes in the node layout is considered potential candidates for paths in a route network. In process 304, route planner program 112 determines the time steps in which each node of the node layout is included on a boundary of a parcel with harvestable resources. Based on the age or maturity of a parcel, route planner program 112 sets a flow indicator for nodes on a boundary of a harvestable parcel. In some embodiments, at least one of the harvestable nodes for each harvestable parcel is required to be part of the route network. In other embodiments, all harvestable nodes are required to be part of the route network.

In process 306, route planner program 112 determines the time invariant costs for paths between adjacent nodes. Time invariant costs are costs to create paths between two nodes that do not change over the time-period that a route network is being determined by route planner program 112. For example, a path between two adjacent nodes requires an up-front cost to prepare the area between the nodes for a path (e.g., flattening the land surrounding the area of the path). As another example, a path between two nodes is a certain length. Route planner program 112 determines the cost of materials needed to create the path and includes the cost in the time invariant costs. In process 308, route planner program 112 determines the time variant costs for each path between adjacent nodes.

In process 310, route planner program 112 determines a route network for each time step of the time-period the route network is being planned. Route planner program 112 retrieves any required nodes or paths (e.g., drop-off nodes, preexisting paths, or planned paths) for each time step from route network data 114. Route planner program 112 includes any required nodes or paths for the route network at the time steps they are required to be part of the route network. Route planner program 112 determines which nodes that have flow indicators set for each time step (e.g., the nodes that are on a boundary of a harvestable parcel for that time step). Route planner program 112 generates a potential route network for each time step based on the harvestable nodes and the drop-off nodes. Route planner program 112 determines a route network for each time step using a minimum cost flow algorithm. The harvestable nodes are sources or supply nodes in the minimum cost flow algorithm. The drop-off nodes are the sink or demand nodes of the minimum cost flow algorithm. Both the time invariant costs and, given a certain time step, time variant costs between adjacent nodes are the edge cost of the minimum cost flow algorithm. Any nodes that are not sources or sinks are potential transshipment nodes of the minimum cost flow algorithm. Route planner program 112 determines a route network for each time step with a minimum cost to deliver the harvestable resources for that time step.

In process 312, route planner program 112 optimizes (i.e., minimizes) the time variant costs of the route networks for each time step. For a given route network at a given time step, route planner program 112 determines a time distance for each other time step. Route planner program 112 uses the time distance as a weight to determine the effect that a route network has on route networks for other time steps. In some scenarios, a route network (A) that is at a closer time step to another route network (B) will have a greater effect on the route network (B). Conversely, a different route network (C) at a given time step that is further time steps away from the route network (B) will have a lesser effect (e.g., the difference in time steps is inversely proportional to the weight). The following equation is a non-linear weight used to determine the time distance between two time steps:

$$dt(t, tOther) = \left(\frac{tOther - t}{pl}\right)^2 \quad \text{(E. 1)}$$

In E.1 above, a route network is evaluated at a given time t. For all other time steps (tOther), route planner program 112 determines a time distance. The difference between the given time and all other time steps is scaled by the average lifetime of a path, pl, for paths of the route network. dt(t,tOther) is a non-linear weight assigned to each route network at other time steps based on the time in between the route networks. Route planner program 112 determines a cost-benefit ratio for each route network. For example, the cost-benefit ratio is the amount of resources harvested by the route network divided by the cost of the route network (e.g., the time invariant and variant costs of each path of the route network).

In process 312, Route planner program 112 determines a cost-benefit ratio differential between each time step. The following equation is used to determine the differential in cost-benefit between two time steps:

$$dcb(t, tOther) = \frac{cb(t)}{cb(t) + cb(tOther}} \quad \text{(E. 2)}$$

In E.2 above, cb(t) is the cost-benefit ratio of a route network at time step t. cb(tOther) is the cost-benefit ratio for the route network at another time step. dcb(t,tOther) is a differential between the two cost benefits where another route network with a higher cost-benefit ratio will have a lower differential than when compared to a different route network at a different time step with a lower cost-benefit ratio. Both E.1 and E.2 are used to determine a weight of importance a route network at one step should influence a route network at another time step. E.1 gives greater weight to route networks closer in time to each other and E.2 gives greater weight to route networks with a higher cost-benefit ratio.

In process 312, route planner program offsets the time variant costs of each path for each route network. The current cost of a path is offset by the time-weighted cost-benefit differential cost of the same path in another time step. The following equation is used to offset the current time variant costs of a path of a route network with the time variant cost of the same path in a different time step:

$$\text{newcost}(\text{path},t)=\text{cost}(\text{path},t)-(dt*dcb*\text{cost}(\text{path},t\text{Other})) \quad (E.3)$$

In E.3 above, the current time variant cost is offset by the time-weighted cost-benefit differential cost of the same path in another time step. cost(path,t) is the cost of a path at time t. newcost(path,t) is the updated cost for a path that is offset by the time-weighted cost-benefit differential cost of the same path in another time step. Route planner program 112 performs equations E.1 and E.2 for the route networks at each time step, where during each time step all other time steps are compared. For each comparison, the cost of each path of the network is offset by the time-weighted cost-benefit differential cost of the same path in different time steps.

In decision process 314, route planner program 112 determines whether the offset costs of the route network, as determined in process 312, have lowered the total costs of all route networks for all time steps. Route planner program 112 determines the total cost for all route networks for all time steps prior to the optimization of the time variant costs. Route planner program 112 determines the total cost for all route networks for all time steps after the optimization of the time variant costs. If the costs of the optimized route networks lower the costs of the route networks prior to optimization (YES branch of decision process 314), then route planner program 112 updates the paths of each route network (in process 316) with the offset costs determined in process 312. Each path is set to the cost determined by E.3. Route planner program 112 determines a new route network for each time step using a minimum cost flow algorithm (process 310) with the offset costs of the updated network. Route planner program 112 optimizes (i.e., attempts to lower the costs) the new route networks (process 314). If the optimized route network does not lower costs (NO branch of decision process 314), then route planner program 112 generates a route plan of the previous route networks for each time step, in process 318.

In general, route planner program 112 generates the paths determined in each time step to provide an optimal cost benefit across all time steps. In some embodiments, route planner program 112 displays the paths over a visualization (such as visualization 200 discussed herein), where the paths illustrate the nodes to be connected for a given time step in relation to the parcels of a location with harvestable resources. Route planner program 112 receives input from a user to select a time step. In response, route planner program 112 displays the optimized route network for the selected time step.

Figure 4:
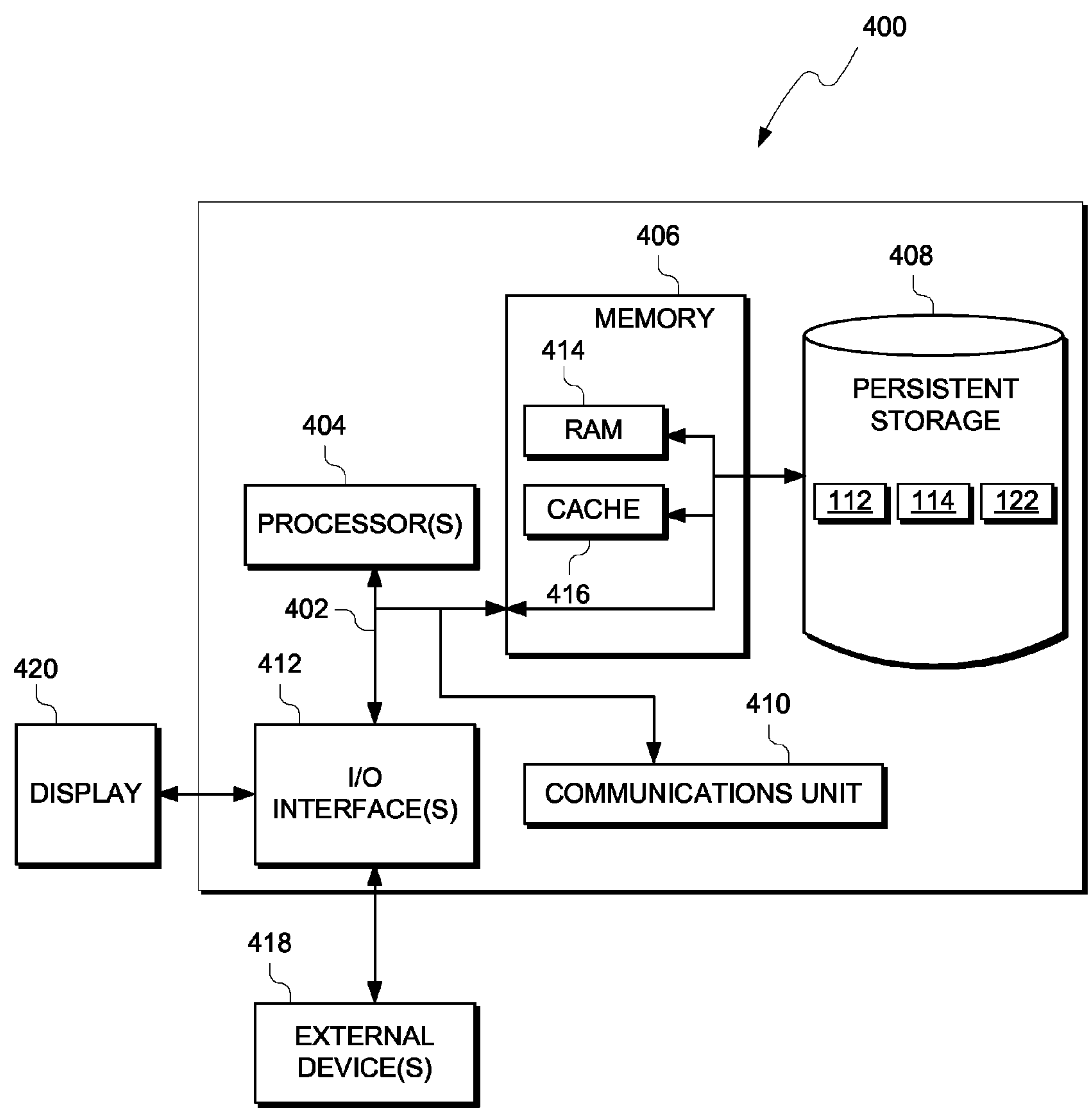
FIG. 4 depicts a block diagram of components of the computing device executing a route planner program, in accordance with an exemplary embodiment of the present invention.

FIG. 4 depicts a block diagram, 400, of components of computing device 110 and database 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 and database 120 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Route planner program 112, route network data 114 and resource data 122 are each stored in respective persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 130. In these examples, communications unit 410 includes one or more network interface cards. Communications unit 410 may provide communications through the use of either or both physical and wireless communications links. Route planner program 112, route network data 114 and resource data 122 may be downloaded to persistent storage 408 through communications unit 410.

I/O interface(s) 412 allows for input and output of data with other devices that may be connected to computing device 110 and database 120. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., route planner program 112, route network data 114 and resource data 122, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A computer program product for generating a route plan for accessing harvestable resources, the computer program product comprising:

one or more computer-readable storage media and program instructions stored on the one or more computer-readable storage media, the program instructions comprising:

program instructions to receive a node layout for a location with harvestable resources, wherein the location includes at least two parcels;

program instructions to determine a first route network for the location at a first time step;

program instructions to determine a second route network for the location at a second time step;

program instructions to determine a first cost-benefit ratio of a path of the first route network;

program instructions to determine a second cost-benefit ratio of the path of the second route network;

program instructions to update the first route network and the second route network based, at least in part, on a differential between the first cost-benefit ratio and the second cost-benefit ratio, wherein the differential includes a weight that is based, at least in part, on a difference between the first time step and the second time step; and program instructions to generate a first route plan is based, at least in part, on the first route network and the second route network.

2. The computer program product of claim 1, wherein the weight is inversely proportional to the difference between the first time step and the second time step.

3. The computer program product of claim 1, the program instructions further comprising:

program instructions to determine a total cost of the first route network;

program instructions to determine a total cost of the updated first route network; and program instructions to generate a second route plan in response to the total cost of the updated first route network having a smaller cost than the total cost of the first route network, wherein the second route plan is based, at least in part, on the updated first route network and the second route network.

4. The computer program product of claim 1, the program instructions further comprising:

program instructions to determine locations of a plurality of nodes in the node layout based, at least in part, on (i) one or more boundaries between the at least two parcels and (ii) one or more directionalities of resources of the at least two parcels.

5. The computer program product of claim 1, wherein the first route network and the second route network are determined using a minimum cost-flow model.

6. A computer system for generating a route plan for accessing harvestable resources, the computer system comprising:

one or more computer processors;

one or more computer readable storage media; and program instructions stored on the computer readable storage media for execution by at least one of the one or more processors, the program instructions comprising:

program instructions to receive a node layout for a location with harvestable resources, wherein the location includes at least two parcels;

program instructions to determine a first route network for the location at a first time step;

program instructions to determine a second route network for the location at a second time step;

program instructions to determine a first cost-benefit ratio of a path of the first route network;

program instructions to determine a second cost-benefit ratio of the path of the second route network;

program instructions to update the first route network and the second route network based, at least in part, on a differential between the first cost-benefit ratio and the second cost-benefit ratio, wherein the differential includes a weight that is based, at least in part, on a difference between the first time step and the second time step; and program instructions to generate a first route plan is based, at least in part, on the first route network and the second route network.

7. The computer system of claim 6, wherein the weight is inversely proportional to the difference between the first time step and the second time step.

8. The computer system of claim 6, the program instructions further comprising:

program instructions to determine a total cost of the first route network;

program instructions to determine a total cost of the updated first route network; and program instructions to generate a second route plan in response to the total cost of the updated first route network having a smaller cost than the total cost of the first route network, wherein the second route plan is based, at least in part, on the updated first route network and the second route network.

9. The computer system of claim 6, the program instructions further comprising:

program instructions to determine locations of a plurality of nodes in the node layout based, at least in part, on (i) one or more boundaries between the at least two parcels and (ii) one or more directionalities of resources of the at least two parcels.

* * * * *